United States Patent [19]

Katou et al.

[11] Patent Number: 4,711,316
[45] Date of Patent: Dec. 8, 1987

[54] GUIDANCE SYSTEM FOR UNMANNED TRANSPORTING VEHICLE

[75] Inventors: Yukio Katou; Takehiro Suzuki, both of Tokyo; Susumu Shimada, Kitamoto, all of Japan

[73] Assignee: Japan Tobacco, Inc., Japan

[21] Appl. No.: 910,833

[22] Filed: Sep. 23, 1986

[30] Foreign Application Priority Data

Sep. 24, 1985 [JP] Japan .................................. 60-208873

[51] Int. Cl.[4] .................................................. B62B 1/02
[52] U.S. Cl. ..................................... 180/168; 318/587
[58] Field of Search .......................... 180/167, 168, 169; 364/424, 447, 449, 450; 318/587

[56] References Cited

U.S. PATENT DOCUMENTS 3,881,568  5/1975  Ando et al. ........................ 180/168

Primary Examiner—John J. Love
Assistant Examiner—Richard Camby
Attorney, Agent, or Firm—Lowe, Price, LeBlanc, Becker & Shur

[57] ABSTRACT

A guidance system for an unmanned transporting vehicle which runs along a guide track. The guide track is composed of a belt-shaped light reflective material and laid out on a floor or the like. The unmanned transporting vehicle has two rows of photodetectors longitudinally arranged thereon forwardly of the front wheel. Since the two rows of the photodetectors are spaced apart from each other with a distance less than the width of the guide track, increasingly forwardly photodetectors begin failing to detecting the guide track earlier when the vehicle runs off the guide track. The vehicle is equipped with control means for controlling the steering mechansim of the vehicle in response to the detection count value such that the front wheel is swivelled to correct the vehicle deviation at a sufficiently early stage.

12 Claims, 26 Drawing Figures

FIG. 9

| Detection Pattern NO | Detection Pattern | | | | | | | | Output SW |
|---|---|---|---|---|---|---|---|---|---|
| | 9L1 | 9L2 | 9L3 | 9L4 | 9R1 | 9R2 | 9R3 | 9R4 | |
| φφ | 0 | 0 | 0 | 0 | 0 | 0 | 0 | 0 | — |
| φ1 | 0 | 0 | 0 | 0 | 0 | 0 | 0 | 1 | SWL4 |
| φ2 | 0 | 0 | 0 | 0 | 0 | 0 | 1 | 0 | E |
| φ3 | 0 | 0 | 0 | 0 | 0 | 0 | 1 | 1 | SWL4, SWL3 |
| φ4 | 0 | 0 | 0 | 0 | 0 | 1 | 0 | 0 | E |
| φ5 | 0 | 0 | 0 | 0 | 0 | 1 | 0 | 1 | E |
| φ6 | 0 | 0 | 0 | 0 | 0 | 1 | 1 | 0 | E |
| φ7 | 0 | 0 | 0 | 0 | 0 | 1 | 1 | 1 | SWL4, SWL3, SWL2 |
| ⋮ | ⋮ | | | | ⋮ | | | | ⋮ |
| 1φ | 0 | 0 | 0 | 1 | 0 | 0 | 0 | 0 | SWR4 |
| 11 | 0 | 0 | 0 | 1 | 0 | 0 | 0 | 1 | E |
| 12 | 0 | 0 | 0 | 1 | 0 | 0 | 1 | 0 | E |
| ⋮ | ⋮ | | | | ⋮ | | | | ⋮ |
| FF | 1 | 1 | 1 | 1 | 1 | 1 | 1 | 1 | E |

FIG. 17

| Address (Count value) | Program | Content of operation | Operation Classification code |
|---|---|---|---|
| φ | φφ | Neglect | |
| 1 | φ2 | Left turn | φφ  Neglect |
| 2 | φ3 | Right turn | φ1  Stop (temporary stop) |
| 3 | φφ | Neglect | φ2  Left turn |
| 4 | φ4 | Other-truck detection ON | φ3  Right turn |
| 5 | φ5 | Other-truck detection OFF | φ4  Other-truck detection ON |
| 6 | φ1 | Temporary stop | φ5  Other-truck detection OFF |
| 7 | φ4 | Other-truck detection ON | |
| 8 | φ5 | Other-truck detection OFF | 1φ  Counter reset and stop |
| 9 | φ4 | Other-truck detection ON | |
| 10 | φ5 | Other-truck detection OFF | |
| 11 | 1φ | Counter reset and stop | |

GUIDANCE SYSTEM FOR UNMANNED TRANSPORTING VEHICLE

BACKGROUND OF THE INVENTION

The present invention relates to an unmanned transporting vehicle, and more particularly a guidance system for an unmanned transporting vehicle which automates the transportation of raw materials, products etc, in a factory, a storehouse or the like.

As guide means for an unmanned transporting truck, there are, for example, a method wherein an electric wire is buried in a floor, a magnetic field is generated by causing a high-frequency current to flow through the electric wire, and the unmanned transporting truck is run along the electric wire by detecting the magnetic field, and a method wherein a tape having a reflection factor unequal to that of a floor is stuck on the floor or such a line is depicted thereon, and the unmanned transporting truck is run along the tape or the line by detecting the difference of the reflection factors.

With the former method, the construction work of the floor is very laborious. Moreover, the floor construction work must be done each time the running route is altered, These incur the problems that the method lacks in adoptability for the alteration of the running route, and that it involves a high cost.

In contrast, with the latter method, it suffices to merely stick the tape or depiot the line on the floor. Therefore, the running route can be readily prepared or altered, at a low cost.

As the unmanned transporting truck which adopts the latter method, there has heretofore been known one wherein a large number of photoelectric detectors, each of which comprises in combination a light receiving element such as photodiode or phototransistor and a light emitting element such as fluorescent lamp or light emitting diode, are juxtaposed on the lower surface of the body of the transporting truck so as to cross the optical guide band such as tape or line (hereinbelow, simply written as 'guide band'), and reflected light from the guide band is received to detect the lateral displacement of the transporting truck relative to the guide band, whereupon a steering mechanism is controlled so as to reduce the lateral displacement (refer to the U.S. Pat. No. 3,881,568 to Ando et al).

With the above unmanned transporting truck, however, the steering mechanism is controlled after the lateral displacement of the transporting truck relative to the guide band has arisen, resulting in the problem that the meandering amount of the transporting truck increases and makes it difficult to stop the truck in the vicinities of a machine tool etc.

SUMMARY OF THE INVENTION

The first object of the present invention is to provide a guidance system for an unmanned transporting vehicle which can be run along a guide track without meandering excessively.

The second object is to provide an unmanned transporting truck which can be run along a guide band without meandering excessively and can also be turned to the right and the left without the fear of departing from the guide track.

The third object is to provide an unmanned transporting vehicle which can be run along a guide track without meandering excessively and can also be run to a destination appointed in advance.

In order to accomplish the objects of the present invention, there is essentially provided a guidance system for an unmanned transporting vehicle which runs along a guide track comprising a belt-shaped light-reflective guide track laid out on a floor or the like, said belt-shaped light-reflective guide track having a predetermined width, and at least one unmanned transporting vehicle including body means; front wheel means and rear wheel means mounted to said body means; drive means for driving at least one of said front wheel means and rear wheel means; a steering mechanism for causing said front wheel means to swivel rightward and leftward; a plurality of photodetectors mounted to said body means forwardly of said front wheel means and longitudinaly arranged in a right-hand row and a left-hand row above said belt-shaped light-reflective guide track, said photodetectors including plural pairs of photodetectors, each pair including a right-hand photodetector and a left hand photodetector, said right-hand and left-hand photodetectors being positioned with a spacing less than said predetermined width, said right-hand photodetector having a light projecting element set to project light onto the belt-shaped light-reflective guide track and a light receiving element to receive the light reflected thereby for detection of the guide track, said left-hand photodetectors having a light projecting element set to project light onto said guide track and a light receiving element to receive the light reflected thereby for detection of the guide track; control means for controlling said steering mechanism such that said front wheel means is caused to swivel leftward when photodetectors in the right-hand row fails to detect the guide track whereas said front wheel means is caused to swivel rightward when photodetectors in the left-hand row fails to detect the guide track, the degree of said swivelling of the front wheel means being substantially in proportion to the number of photodetectors which fails to detect the guide track.

BRIEF DESCRIPTION OF THE DRAWINGS

FIG. 9 is a diagram for explaining detection patterns which are used when the steerage control is performed with a microcomputer;

FIG. 11 is an explanatory diagram showing the running route of the unmanned transporting vehicle in a factory, a storehouse or the like;

FIG. 17 is an explanatory diagram showing the program content of a program memory circuit in the goal control device;

PREFERRED EMBODIMENTS OF THE INVENTION

Now, an embodiment of the present invention will be described with reference to the drawings.

Figure 1:
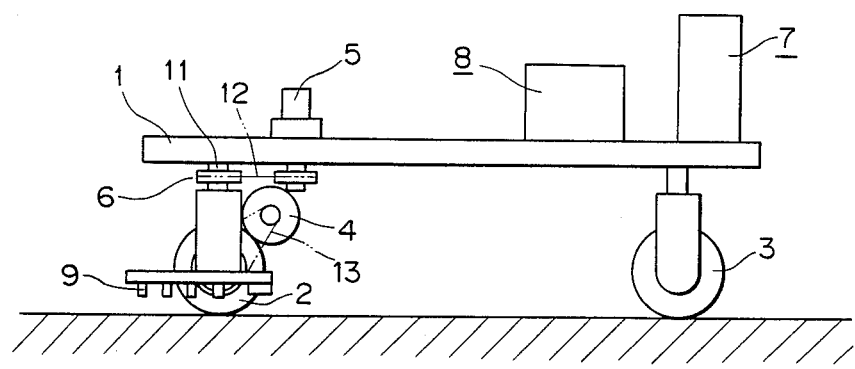
FIG. 1 is a schematic side view of an unmanned transporting vehicle embodying the present invention.
Figure 2:
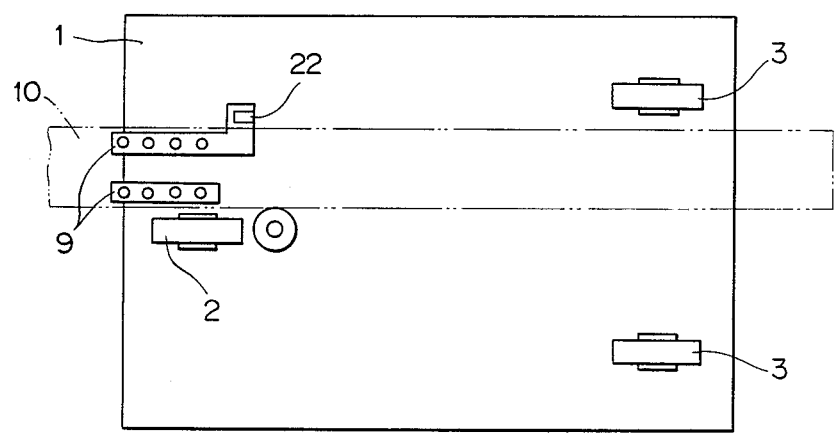
FIG. 2 is a bottom view of the vehicle.
Figure 3:
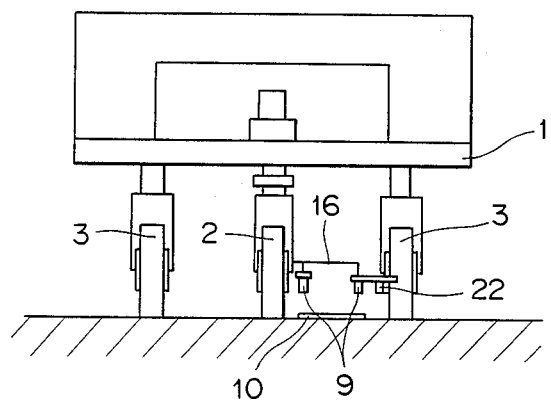
FIG. 3 is a front view of the vehicle.

FIGS. 1-3 show the body of an unmanned transporting vehicle according to the present invention, in which numeral 1 designates the body, numeral 2 a front wheel, numerals 3 rear wheels, numeral 4 a driving motor, numeral 5 a steering motor, numeral 6 a steering mechanism, numeral 7 a control box, numeral 8 a battery, numeral 9 guide track detection means, and numeral 10 a belt-shaped guide track having a predetermined width.

The guide track 10 is formed of a tape of aluminum foil the light reflection factor of which is greater than that of a ground or floor surface. The tape of the aluminum foil may well be replaced with a white which is light-replective paint coated on the floor surface in a belt shape.

The vehicle body 1 runs along the guide track 10, and is furnished with the single front wheel 2 and the two rear wheels 3. The front wheel 2 travels along the side part of the guide track 10 so as not to tread this guide track.

Also, the body 1 is furnished with the steering mechanism 6. This steering mechanism 6 is constructed of a steering shaft 11 which is rotatably installed on the body 1, and a transmission mechanism 12 which consists of a chain and a pulley for transmitting the rotation of the steering motor 5 to the steering shaft 11. The front wheel 2 is mounted on the steering shaft 11. This front wheel 2 is steered by the steering mechanism 6, and serves as a steering wheel which is swiveled rightward and leftward.

A chain 13 is extended between the front wheel 2 and the driving motor 4, and the front wheel 2 is driven and rotated by the driving motor 4. That is, the front wheel 2 serves as the steering wheel and also as a driving wheel.

In addition, the battery 8 and the control box 7 are carried on the body 1. The battery 8 serves as a power source for the driving motor 4, the steering motor 5 and the control box 7.

The control box 7 is furnished therein with a steerage control device 17, a branch control device 18, a drive control device 19, a goal control device 20 and an other-vehicle detection device 21 to be described later.

Figure 4:
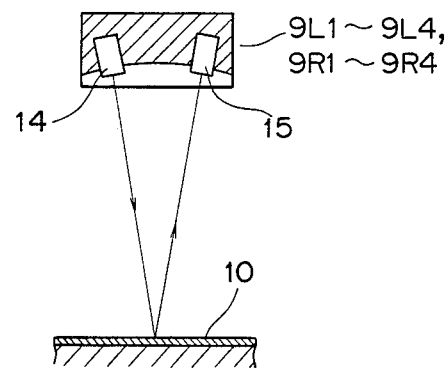
FIG. 4 is a schematic sectional view of a photodetector.

The guide track detection means 9 is constructed of a plurality of photodetectors ( reflection type photoelectric detectors; refer to FIG. 4) 9L1-9L4 and 9R1-9R4 which are mounted to the body forwardly of an axis of the front wheel 2 and each of which comprises in combination a light projecting element (light emitting diode) 14 for projecting light on the belt-shaped light-reflective guide track 10, and a light receiving element 15 for receiving the light reflected by the guide track 10. The photodetectors 9L1-9L4 and those 9R1-9R4 are longitudinally arranged on a member 16 unitary with the steering shaft 11 in a right-hand row and a left-hand row above said guide track 10. Said photodetectors 10 include plural pairs, each of which include a right-hand detector and a left-hand detector spaced at an interval narrower than said predetermined width of the guide track 10 to avoid the mutual interference. An amplifier portion (not shown) for the photodetectors 9L1-9L4 and 9R1-9R4 is built in the control box 7.

Figure 5:
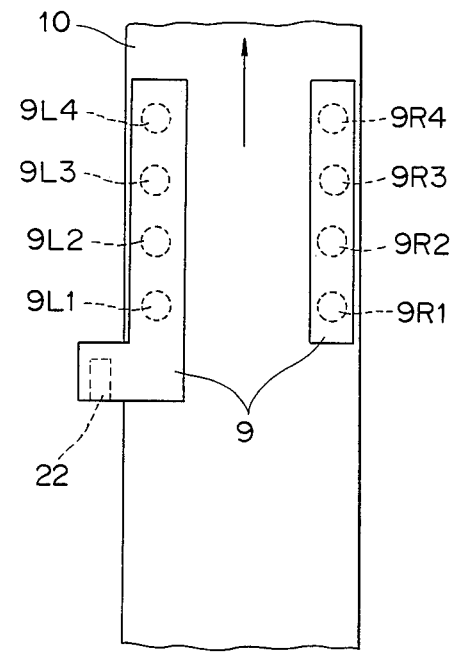
FIG. 5 is an explanatory diagram showing the arrangement state of guide track detection means.
Figure 8A:
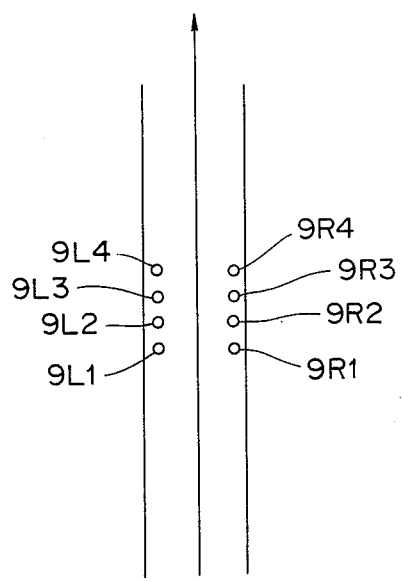
FIGS. 8a–8c are diagrams for explaining a steerage control.
Figure 8B:
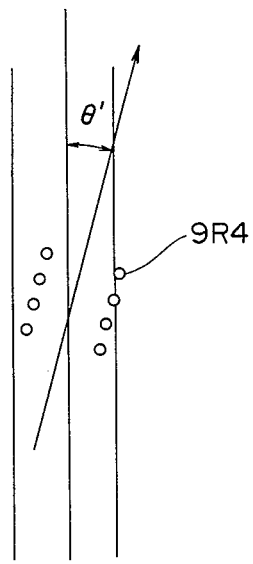
Figure 8C:
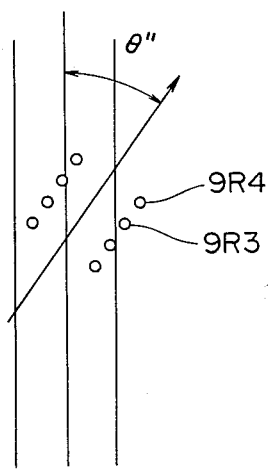

When the body 1 is running along the guide track 10, the photodetectors 9L1-9L4 and 9R1-9R4 are located above the guide track 10 and receive the reflected light from this guide track 10 as illustrated in FIGS. 5 and 8 a. However, when the running direction of the truck body 1 deviates from the center line of the guide track 10 (when a drift angle develops between the running direction of the body 1 and the center line of the guide track 10), the photodetectors 9L1-9L4 and 9R1-9R4 come away from the guide track 10 and fail to receive the reflected light as illustrated in FIGS. 8 b and 8 c (the photodetector 9R4 in the case of FIG. 8 b and the photodetectors 9R4 and 9R3 in the case of FIG. 8 c fail to receive the reflected light). Therefore, it can be detected that the running direction of the body 1 has deviated from the center line of the guide track 10.

This embodiment has exemplified the case of using the photodetectors 9L1-9L4 and 9R1-9R4 totaling eight, but as the number of arrangement of the photodetectors is increased, the deviation of the running direction of the truck body 1 relative to the center line of the guide track 10 can be detected precisely accordinly. By arraying the photodetectors along the guide track 10, the deviation can be detected at a range before the lateral displacement of the body 1.

Next, the steerage control device 17 for running the body 1 (the unmanned transporting vehicle) along the guide track 10 will be described with reference to FIG. 6.

In the figure, switches SWL1-SWL4 correspond to the photodetectors 9R1-9R4, while switches SWR1-SWR4 correspond to the photodetectors 9L1-9L4. The switches SWL1-SWL4 turn ON when the photodetectors 9R1-9R4 are OFF (when these photodetectors come off the guide track 10 and fail to receive the reflected light from this guide track), and they turn OFF when the photodetectors 9R1-9R4 are ON (when these photodetectors receive the reflected light from the guide track 10). Likewise, the switches SWR1-SWR4 turn ON when the photodetectors 9L1-9L4 are OFF (when these photodetectors come off the guide track 10 and fail to receive the reflected light from this navigation band), and they turn OFF when the photodetectors 9L1-9L4 are ON (when these photodetectors receive the reflected light from the guide track 10).

One end of each of the switches SWL1-SWL4 is connected to the battery 8, and the other ends of these switches are connected through resistors RL1-RL4 to a control winding WL which rotates the stearing motor 5 in the left direction. Besides, one end of each of the switches SWR1-SWR4 is connected to the battery 8, and the other ends of these switches are connected through resistors RR1-RR4 to a control winding WR which rotates the stearing motor 5 in the right direction.

When, from the state shown in FIG. 8 a under which the body 1 is running along the guide track 10, the running direction declines by an angle $\theta'$ rightwards relative to the center line of the guide track 10 as shown in FIG. 8 b (when a drift angle $\theta'$ arises between the running direction of the body 1 and the center line of the guide track 10), the photodetector 9R4 which is the remotest from the central position of the front wheel 2 comes off the guide track 10. In the circuit of FIG. 6, the switch SWL4 turns ON, current is fed from the battery 8 through the resistor RL4 to the control winding WL, and the steering motor 5 is rotated in the left direction in correspondence with the drift angle $\theta'$ to swivel the front wheel leftward through steering mechanism 6, whereby the deviation is corrected. When the running direction of the body 1 comes away still more and declines by an angle $\theta''$ as shown in FIG. 8 c. (When a drift angle $\theta''$ arises between the running direction of the body 1 and the center line of the guide track 10), the remotest photodetector 9R4 and the second-remotest photodetector 9R3 from the central position of the front wheel 2 come off the guide track 10. In the circuit of FIG. 6, the switches SWL4 and SWL3 turn ON, current in an amount larger than in the preceding case is fed from the battery 8 to the control winding WL because of the connection of the resistor RL3 in parallel with the resistor RL4, and the steering motor 5 is rotated in the left direction in correspondence with the drift angle $\theta''$ to swivel the front wheel leftward through steering mechanism 6, wherein the deviation is corrected. In a case where the body 1 has deviated leftwards the deviation is corrected in a reverse manner.

Thus, when the running direction of the body 1 deviates, the photodetectors come off the guide track 10 successively from the photodetector 9R4 (9L4) which the remotest from the front wheel 2. As the deviation enlarges, the resistance between the battery 8 and the control winding WL (WR) lowers in succession, and the amount of current to be fed to the control winding WL (WR) for the correction of the deviation increases.

Figure 7:
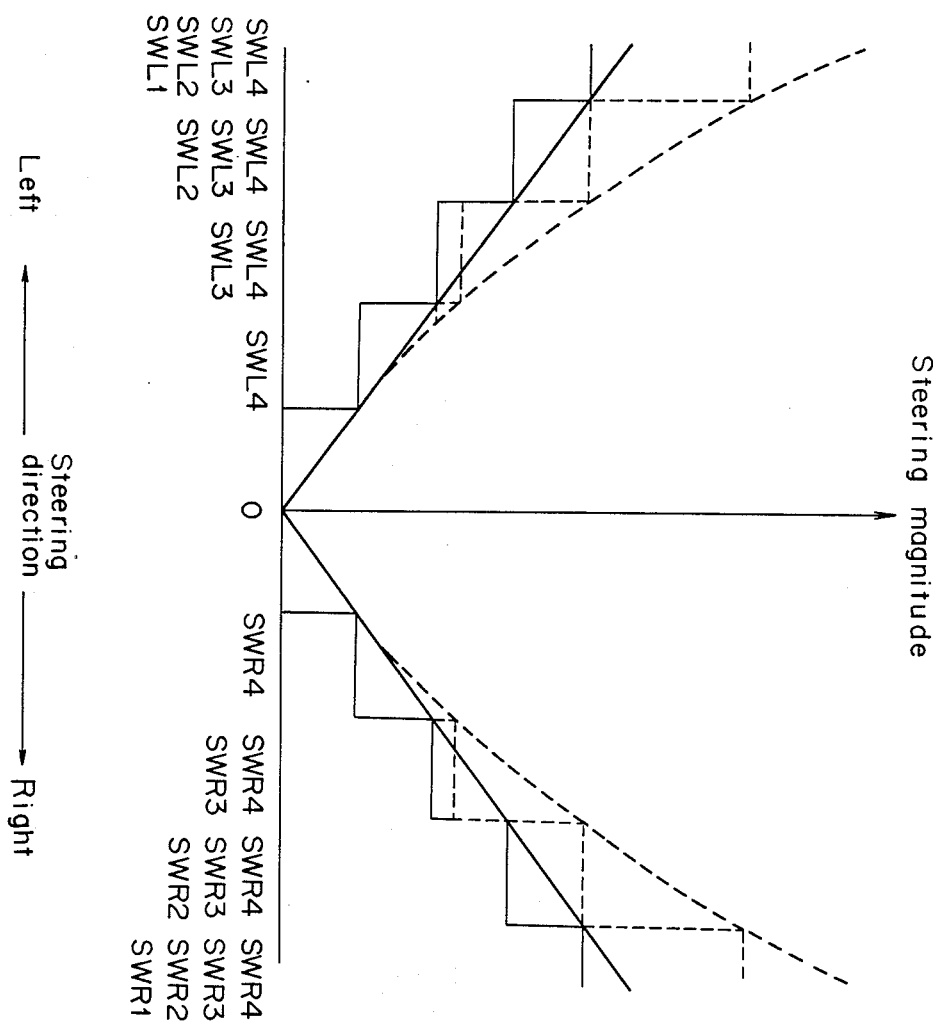
FIG. 7 is a graph showing the relationship between a steering amount and a deviation.

FIG. 7 shows the relationship between the deviation of the body 1 and the steering magnitude (the amount of current to be fed to the control winding WL or WR). In the figure, the axis of ordinates indicates the steering magnitude (the amount of current to be fed to the control winding WL or WR), and the right side of the axis of abscisses represents the number in which the switches SWR1-SWR4 corresponding to the photodetector 9L1-9L4 have turned ON (the number corresponds to the magnitude of the leftward deviation), while the left side of the axis of abscisses represents the number in which the switches SWL-SWL4 corresponding to the photodetectors 9R1-9R4 have turned ON (the number corresponds to the magnitude of the rightward deviation).

A steering characteristic indicated by a solid line in the figure corresponds to a case where the resistances of the respective resistors RL1-RL4 and RR1-RR4 are equalized. The steering characteristic of the steerage control device 17 can be put to a curve as indicated by a dotted line in the figure, by varying the resistance in conformity with the installed positions of the photodetectors 9L1-9L4, 9R1-9R4 and the characteristic of the steering motor 5. The approximation of the steering characteristic to a quadratic curve or a cubic curve makes it possible to quicken the correction of a deviation when the deviation is large.

Although, in the above embodiment, the steerage control device 17 has been exemplified as performing the steerage control under the sequence control, it may well be constructed so as to perform the steerage control with a microcomputer. In this case, detection patterns of hexadecimal codes as listed in FIG. 9 are created on the basis of the outputs of the photodetectors 9L1-9L4 and 9R1-9R4, and the detection patterns are retrieved, thereby to control the amount of current for the control winding WL or WR of the steering motor 5.

According to the detection patterns listed in FIG. 9, the outputs of the photodetectors 9L1-9L4 and 9R1-9R4 are "0" when the reflected light from the guide track 10 has been received (when the photodetectors are located above the guide track 10), and they are "1" when the reflected light is not received (when the photodetectors have come Away from the guide track 10).

Figure 6:
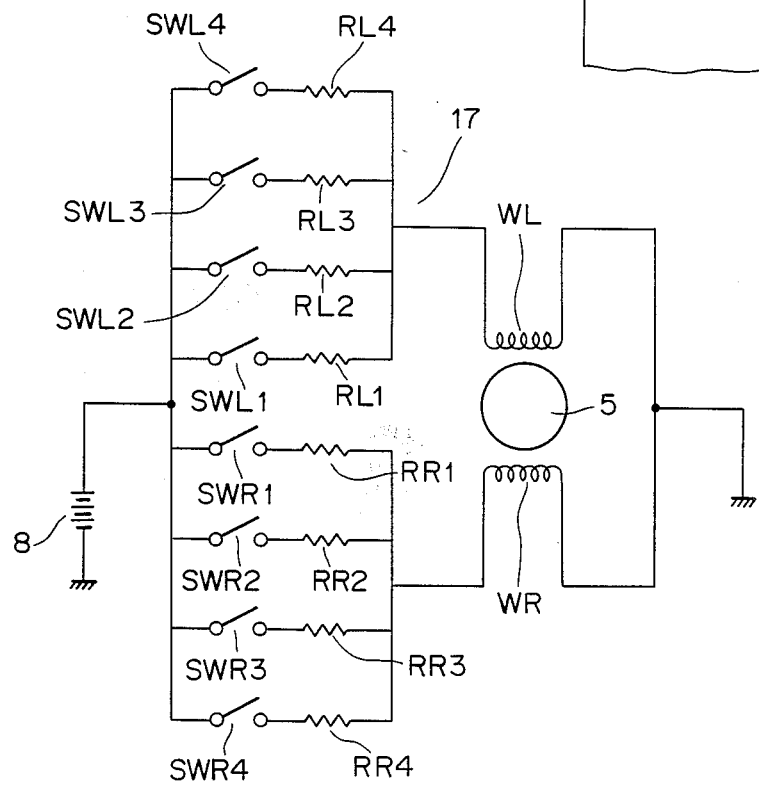
FIG. 6 is a circuit diagram of a steerage control device.

An output SW indicates which of the switches SWLL SWL4 and SWR1-SWR4 in FIG. 6 is/are turned ON upon the generation of the detection pattern. "SWL4" signifies to turn ON the switch SWL4, "SWL4, SWL3" signifies to turn ON the switches SWL4 and SWL3, "—" signifies that all the switches SWL1-SWL4 and SWR1-SWR4 are OFF, and "E" signifies the detection pattern which cannot exist usually.

Figure 10:
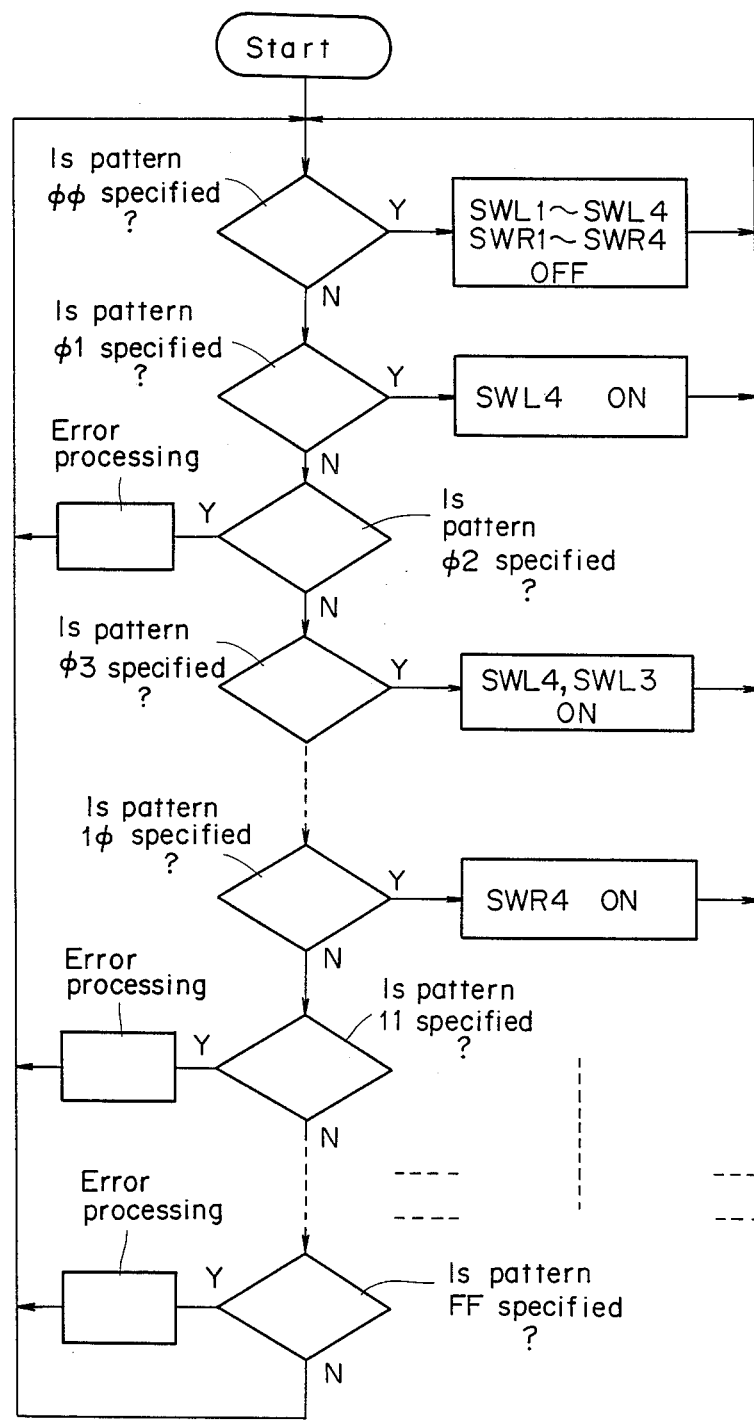
FIG. 10 is a flow chart showing the operation of the microcomputer which is used for the steerage control.

In the case of controlling the steerage with the microcomputer in this manner, a flow chart shown in FIG. 10 is conformed to.

The microcomputer is used to discriminate which detection pattern the outputs of the photodetectors 9L1-9L4 and 9R1-9R4 specify, and to turn ON the switches SWL1-SWL4 and SWR1-SWR4 corresponding to the detection pattern. For example, when the detection pattern is NO $\emptyset\emptyset$, the switches SWL1-SWL4 and SWR1-SWR4 are all turned OFF, and when it is NO $\emptyset 1$, the switch SWL4 is turned ON. In case of the detection pattern which is usually impossible, it is skipped, or error processing such as load is executed again. Thus, it turns out possible to perform the control which is equivalent to the steerage under the sequence control.

When the control based on the drift angle is performed in this manner, a predictive control becomes possible unlike the prior-art control based on the deviation, and hence, the unmanned transporting truck can be stably run with a reduced meandering amount.

The above embodiment has been exemplified as arranging the photodetectors 9L1-9L4 and 9R1-9R4 on the member 16 which is unitary with the steering shaft 11. However, the photodetectors 9L1-9L4 and 9R1-9R4 may well be arranged on the bottom surface of the truck body 1, whereupon the drift angle between the body 1 and the center line of the guide track 10 is detected, the drift angle between the running direction of the body 1 and the center line of the guide track 10 is calculatively found from the first-mentioned drift angle and the detection signal of an angle detector (such as rotary encoder) for detecting a steering angle, and the running direction is controlled so as to render the second-mentioned drift angle null.

Figure 11:
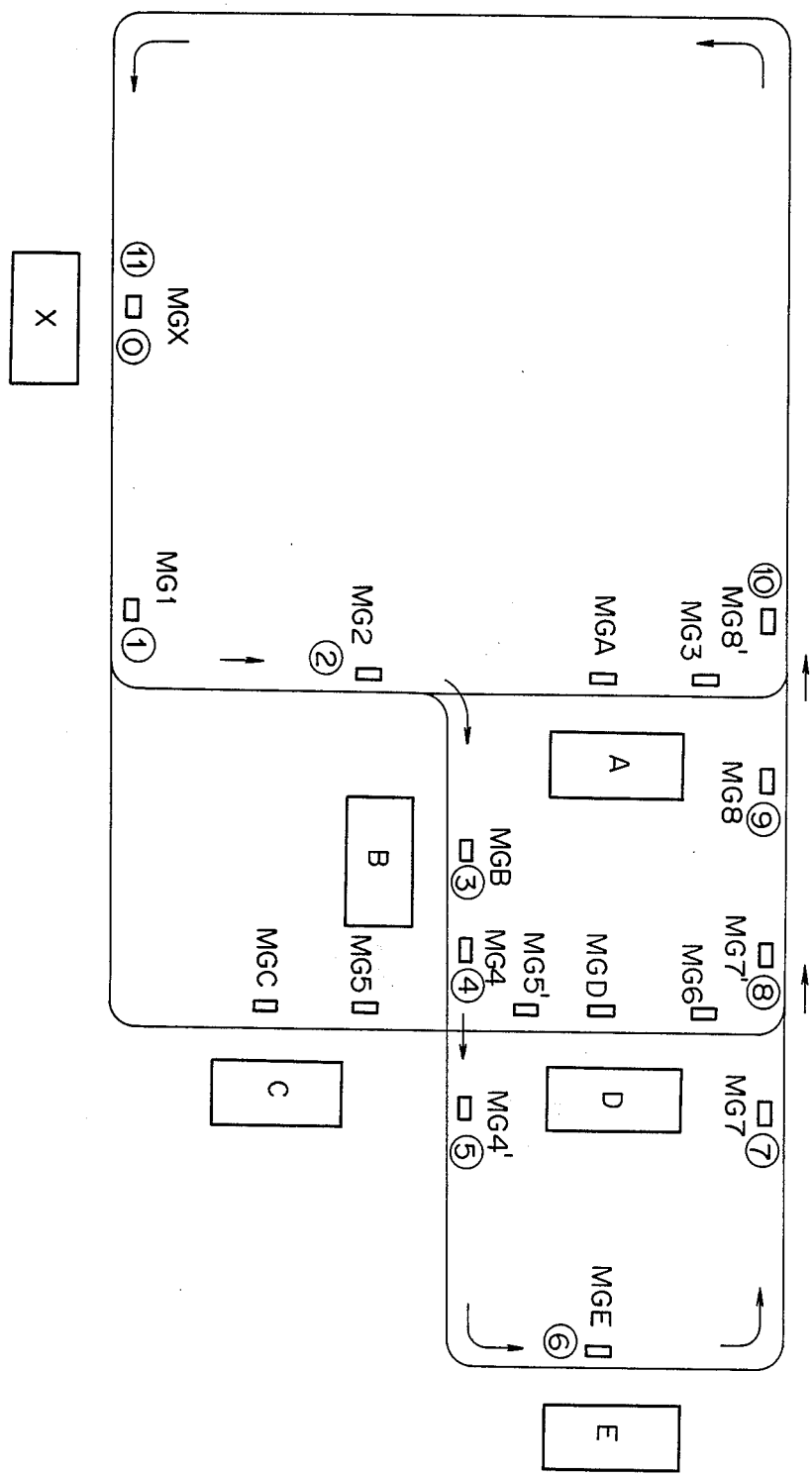
Figure 12:
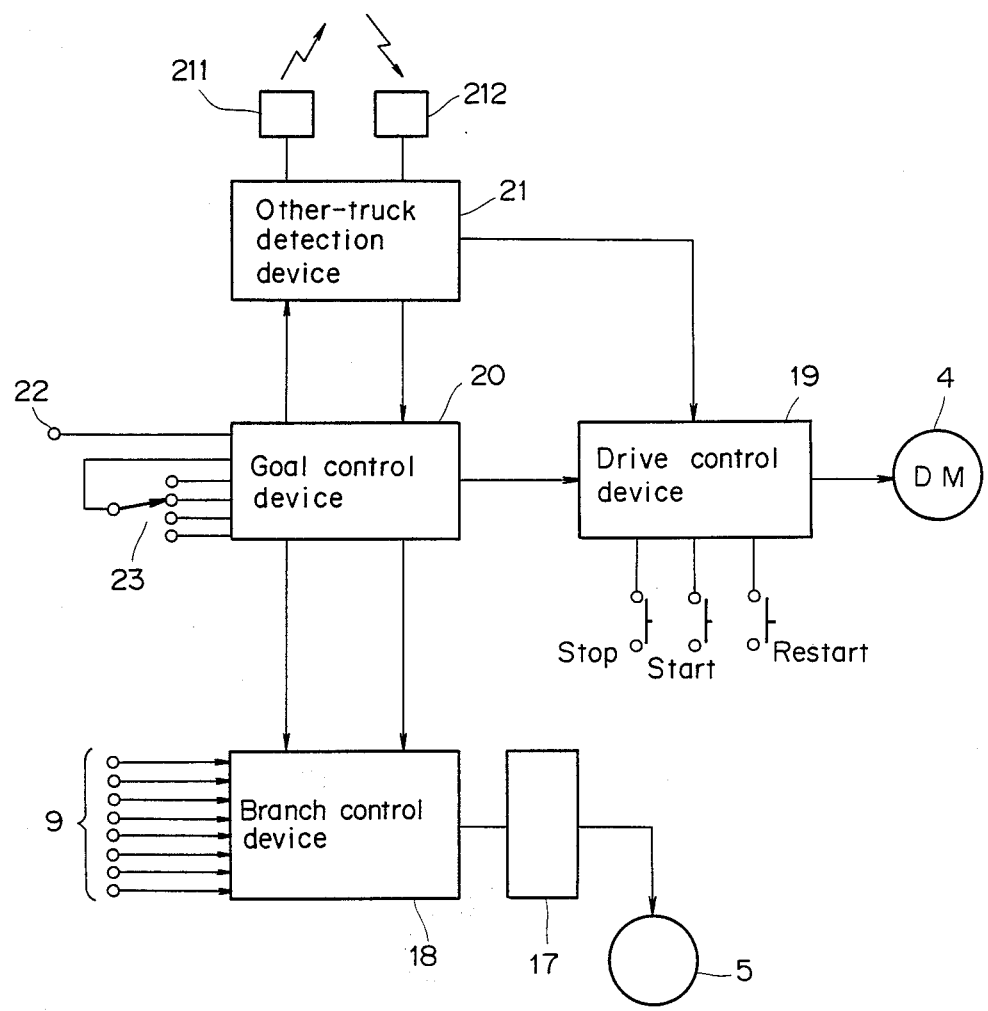
FIG. 12 is a block diagram of a control apparatus which is used when the unmanned transporting vehicle is run along the running route.

Owing to the steerage control device 17 stated above, the body 1 (the unmanned transporting vehicle) is permitted to run without coming off the guide track 10. In an actual factory or storehouse by way of example, however, complicated transportation routes as shown in FIG. 11 are traced (X indicates a base camp, A-E indicate work stations, and MG1-MG8, MGA-MGE and MGX indicate magnets which are ground marks). To wit, said belt-shaped light-reflective guide has a common section and two branch sections which cooperate to define a plurality of branch-off points. Said two branch-off sections intersect each other. Said magnets are placed at portions where specific work is to be done, immediately upstream of tthe branch-off points and immediately upstream of the intersection. For the purpose of running the unmanned transporting vehicle from the starting point (the base camp) to the destination (the work station), therefore the vehicle needs to turn to the right or the left and to avoid colliding against another unmanned transporting vehicle at the intersection or the branch-off point under a running control which employs, not only the steerage control device 17, but also the branch control device 18, drive control device 19, goal control deivice 20, other vehicle detection device 21 etc. shown in FIG. 12. In case of running only one unmanned transporting vehicle, the other-vehicle detection device 21 is unnecessary because no collision is feared.

In the running control, when the unmanned transporting vehicle runs from the base camp X toward any of the work stations A-E or when it returns from any of the work states A-E to the base camp X, the magnets MG1-MG8, MGA-MGE and MGX are detected by a position detecting sensor 22 installed on the unmanned transporting truck (refer to FIGS. 2, 3, 5 and 12). In addition, the other-vehicle detection device 21 detects another unmanned transporting vehicle, while the goal control device 20 supplies the branch control device 18 and the drive control device 19 with signals for right turn, left turn, temporary stop, etc. on the basis of the detection signals of the position detecting sensor and the other-vehicle detection device.

In a case where the position detecting sensor 22 has detected the magnet MG4 (MG5, MG3, MG8, MG6 or MG7) and where the goal control device 20 has decided the approach of the unmanned transporting vehicle to the intersection or the junction, an activating signal is sent from the goal control device 20 to the other vehicle detection device 21, the transmitting antenna 211 of which transmits a running signal (electromagnetic wave) and the receiving antenna 212 of which begins to receive the reception of a running signal transmitted from the other unmanned transporting vehicle.

In a case where the receiving antenna 212 does not receive the detection signal from the other unamnned transporting vehicle, the unmanned transporting vehicle enters the intersection or the junction while continuing to transmit the detection signal from the transmitting angenna 211. Then, when the position detecting sensor 22 has detected a magnet MG4' (MG5', MG8' or MG7') again, the goal control device 20 decides the passage of the vehicle through the intersection or the junction and sends a deactivating signal to the other-vehicle detection device 21. In response to the deactivating signal, the other-vehicle detection device 21 stops the operation of transmitting the detection signal and the operation of receiving the detection signal from the other unmanned transporting vehicle.

In a case where the receiving antenna 212 has received the running signal from the other unamnned transporting vehicle, the other-vehicle detection device 21 sends an other-vehicle detection signal to the drive control device 19, and the unmanned transporting vehicle is stopped near the intersection or the junction to avoid celliding with the other unmanned transporting vehicle.

Next, the drive control device 19 will be described in detail.

Figure 13:
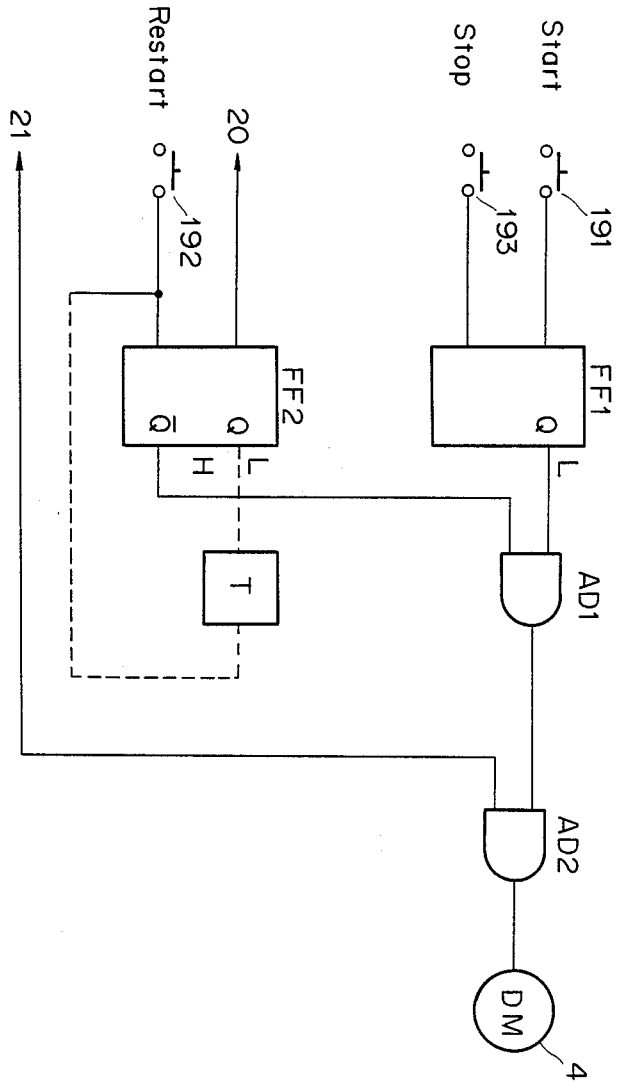
FIG. 13 is a block diagram showing the drive control device of the control apparatus in detail.

This drive control device 19 controls the operation and stop of the driving motor 4, and is arranged as shown in FIG. 13 by way of example. In the figure, symbols FF1 and FF2 denote flip-flop circuits, which have their output Q set at "L" (low level) and their output $\overline{Q}$ at "H" (high level) upon the closure of power supply.

When a starting pushbutton switch 191 is turned ON after the closure of the power supply, the flip-flop FF1 is inverted to change the output Q from "L" to "H", and one input node of an AND circuit AD1 becomes "H". Meanwhile, since the output $\overline{Q}$ of the flip-flop FF2 is "H", the other input node of the AND circuit AD1 is "H". Accordingly, the output node of the AND circuit AD1 becomes "H", and one input node of an AND circuit AD2 becomes "H".

The other input node of the AND circuit AD2 is connected to the other-vehicle detection device 21. It is "L" when the other-vehicle detection device 21 has detected the other unmanned transporting vehicle, and it is "H" when not.

In the absence of the other unmanned transporting vehicle, both the inputs nodes of the AND circuit AD2 are "H", and an activating signal is provided from the output node thereof to the driving motor 4, so that the unmanned transporting vehicle is run. In the presence of the other unmanned transporting vehicle, the driving motor 4 is not activated, and the unmanned transporting vehicle remains stopped.

When a restarting pushbutton switch 192 is turned ON in the absence of the unmanned transporting vehicle, the driving motor 4 operates to the unmanned transporting vehicle. Thus, the unmanned transporting vehicle can be run without colliding against the other.

When the goal control device 20 sends the temporary stop signal to the flip-flop FF2, this flip-flop is inverted to change the output $\overline{Q}$ from "H" to "L" and the output node of the AND circuit AD1 becomes "L". In consequence, the activating signal is not sent from the pputput node of the AND circuit AD2, and the unmanned transporting vehicle is stopped.

The temporary stop signal is usually sent when the vehicle has arrived at any of the work stations A-E. When the restrating pushbutton switch 192 is turned ON after the end of a job in any of the work stations A-E the flip-flop FF2 is inverted to change the output $\overline{Q}$ from "L" to "H", and the output nodes of the AND circuits AD1 and AD2 becomes "H", so that the unmanned transporting vehicle is run again.

If a job time in the work station is know beforehand, a timer T can be connected as indicated by a broken line in FIG. 13. Thus, it is dispensed with to turn ON the restarting pushbutton switch 192 on each occasion.

In a case where the vehicle is to be stoped during the running thereof, a stopping pushbutton switch 193 is turned ON. Thus, the flip-flop FF1 is inverted to change the output Q from "H" to "L", and the unmanned transporting vehicle is stopped.

Next, the branch control circuit 18 will be described in detail.

Figure 14:
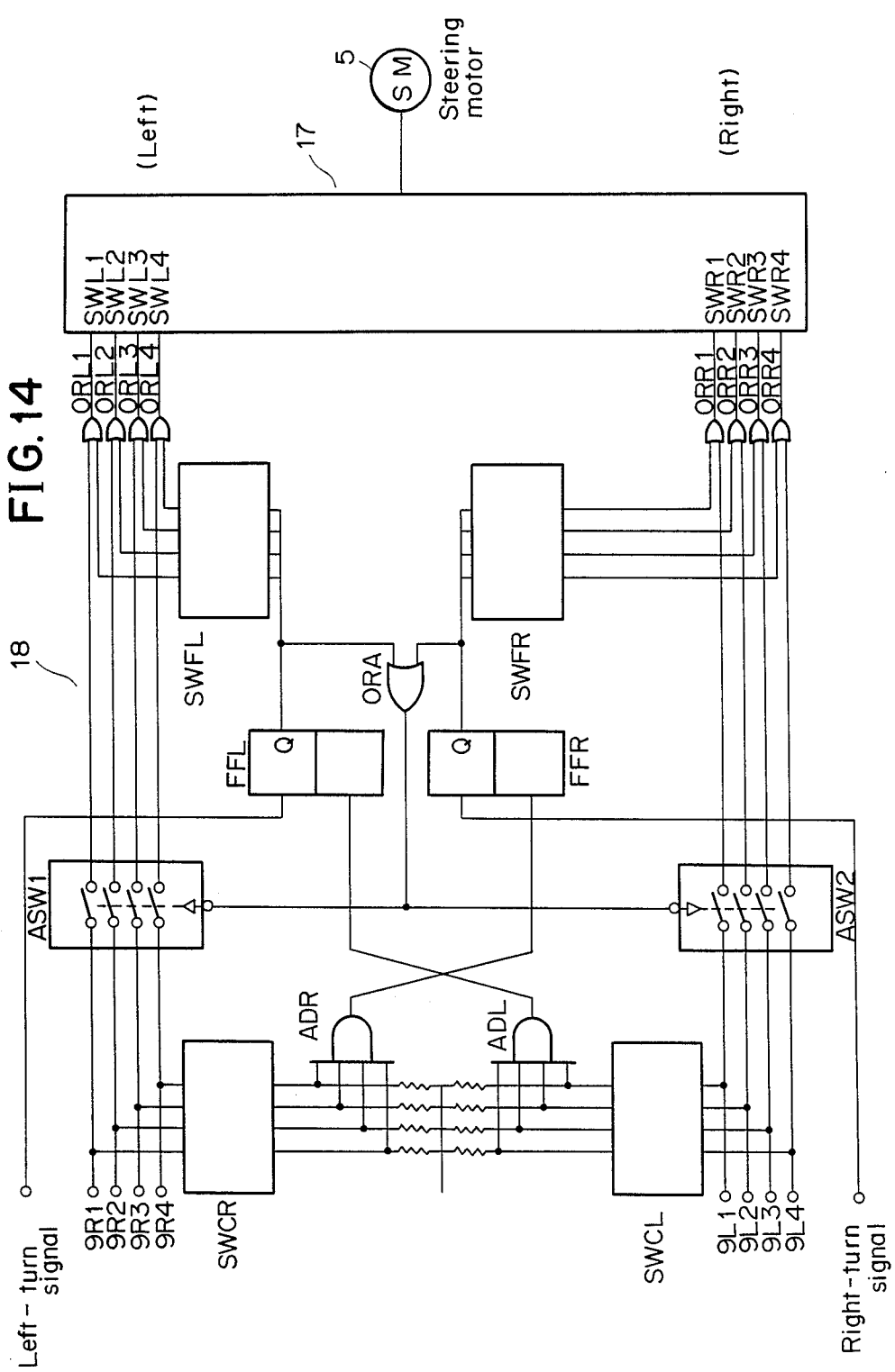
FIG. 14 is a block diagram showing the branch control device of the control apparatus in detail.
Figure 15A:
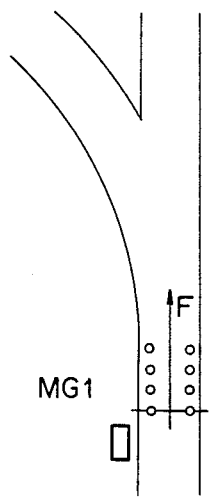
FIGS. 15a-15e are diagrams for explaining a left-turn operation.
Figure 15B:
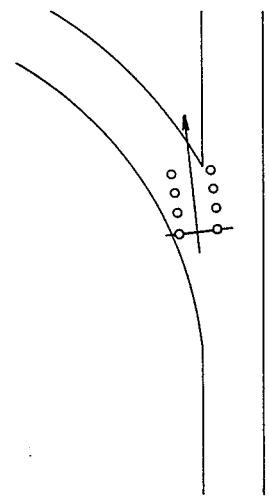
Figure 15C:
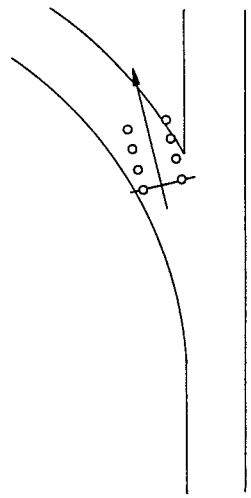
Figure 15D:
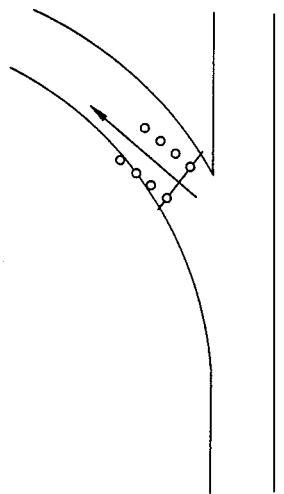
Figure 15E:
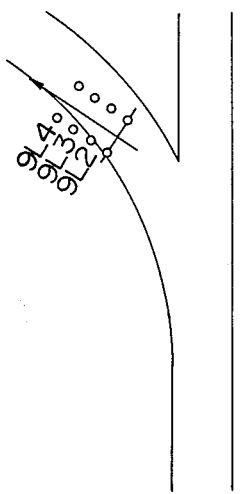

This branch control circuit 18 controls the steering motor 5 and the steerage control device 17 when the body 1 is to be turned to the left or right, and it is arranged as shown in FIG. 14 by way of example. In the figure, symbols ADR and ADL denote AND circuits, symbols ASW1 and ASW2 analog switches, symbol SWCL a left-turn completion switch, symbols SWCR a right-turn completion switch, symbol SWFL a forced left-turn switch, symbol SWFR a forced right-turn switch, symbols FFR and FFL flip-flops, and symbols ORA, ORL1-ORL4 and ORR1-ORR4 OR circuits.

The photodetectors 9R1-9R4 and 9L1-9L4 provide "H" outputs when they have come off the guide track 10, and they provide "L" outputs when they lie over the guide track 10.

The signal of any of the photodetectors 9R1-9R4 and 9L1-9L4 is sent to one input node of the corresponding one of the OR circuits ORL1-ORL4 and ORR1-ORR4 through the analog switch ASW1 or ASW2, and it is also sent to the corresponding input node of the AND circuit ADR or ADL through the right-turn completion switch SWCR or the left-turn completion switch SWCL.

When the output of any of the OR circuits ORR1-ORR4 is applied to the corresponding one of the switches SWR1-SWR4 of the steerage control device 17, the corresponding switch is turned ON. Besides, when the output of any of the OR circuits ORL1-ORL4 is applied to the corresponding one of the switches SWL1-SWL4 of the steerage control device 17, the corresponding switch is turned ON.

A case of turning the unmanned transporting vehicle to the left will be described with reference to FIGS. 15 a-15 e. When the position detecting sensor has detected the magnet MG1 (refer to FIG. 11) in the course of the running of the unmanned transporting vehicle in the direction of arrow F indicated in FIG. 15 a, the left-turn signal is sent from the goal control device 20 to the branch control device 18.

When supplied with this left-turn signal, the flip-flop FFL is inverted to change its output O to "H". Then, the output of the OR circuit ORA is sent to the analog switches ASW1 and ASW2 to turn OFF these analog switches. Thus, the delivery of the signals from the photodetectors 9R1-9R4 and 9L1-9L4 to the steerage control device 17 is interrupted. Simultaneously therewith, signals are provided from the output Q of the flip-flop FL through the left-turn forcing switch SWFL to the input nodes of predetermined ones of the OR circuits ORL1-ORL4. When the input nodes of the OR circuits ORL1-ORL4 are supplied with the signals, the switches SWL1-SWL4 are turned ON, and current is fed from the battery 8 to the control winding WL of the steering motor 5 to forcibly steer the front wheel 2 in the left direction, so that the unmanned transporting vehicle is turned to the left as illustrated in FIGS. 15 b-15 d.

Here, the left-turn forcing switch SWFL is set so as to establish a steering amount which conforms to the degree of a curve or the running speed of the vehicle. More specifically, in a case where the curve is abrupt (the running speed is high), the steering amount needs to be enlarged, and hence, the left-turn forcing switch is set so as to supply the signals from the output Q of the flip-flop FFL to all the OR circuits ORL1-ORL4. In contrast, in a case where the curve is gentle (the running speed is low), the steering amount may be small, and hence, the left-turn forcing switch is set so as to supply the signals from the output Q of the flip-flop FFL to the OR circuit ORL4 or OR circuits ORL4 and ORL3 among the OR circuits ORL1-ORL4.

Thereafter, when those 9L4, 9L3 and 9L2 of the photodetectors 9R1-9R4 and 9L1-9L4 have come off the guide track 10 as illustrated in FIG. 15 e, the AND condition of the signals to enter the input nodes of the AND circuit ADL through the left-turn completion switch SWCL is fulfilled, and the output node of this AND circuit ADL becomes "H". Thus, the flip-flop FFL is inverted to change the output Q from "H" to "L", the output of the OR circuit ORA is also changed from "H" to "L", and the analog switches ASW1 and ASW2 having been OFF are turned ON, whereupon the forced steerage ends and the delivery of the signals from the photodetectors 9R1-9R4 and 9L1-9L4 to the steerage control device 17 is restarted. The vehicle is accordingly controlled and run by the steerage control device 17 so as not to come off the guide track 10.

Here, the AND condition of the AND circuit ADL may make it possible to acknowledge that the front wheel 2 has got on a branch route, and it is set in confprmity with the degree of the curve of the branch route or the running speed. In the case of the abrupt curve (high running speed), the AND condition is set so as to be met when the photodetector 9R4 (9L4) has come off the navigation band 10. Besides, in the case of the gentle curve (low running speed), the AND condition is set so as to be met when the photodetectors 9R4 and 9R3 (9L4 and 9L3) have come off the guide track 10.

In a case where the unmanned transporting vehicle is to be turned to the right, it is similarly controlled.

Next, the goal control device 20 will be described in detail.

Figure 16:
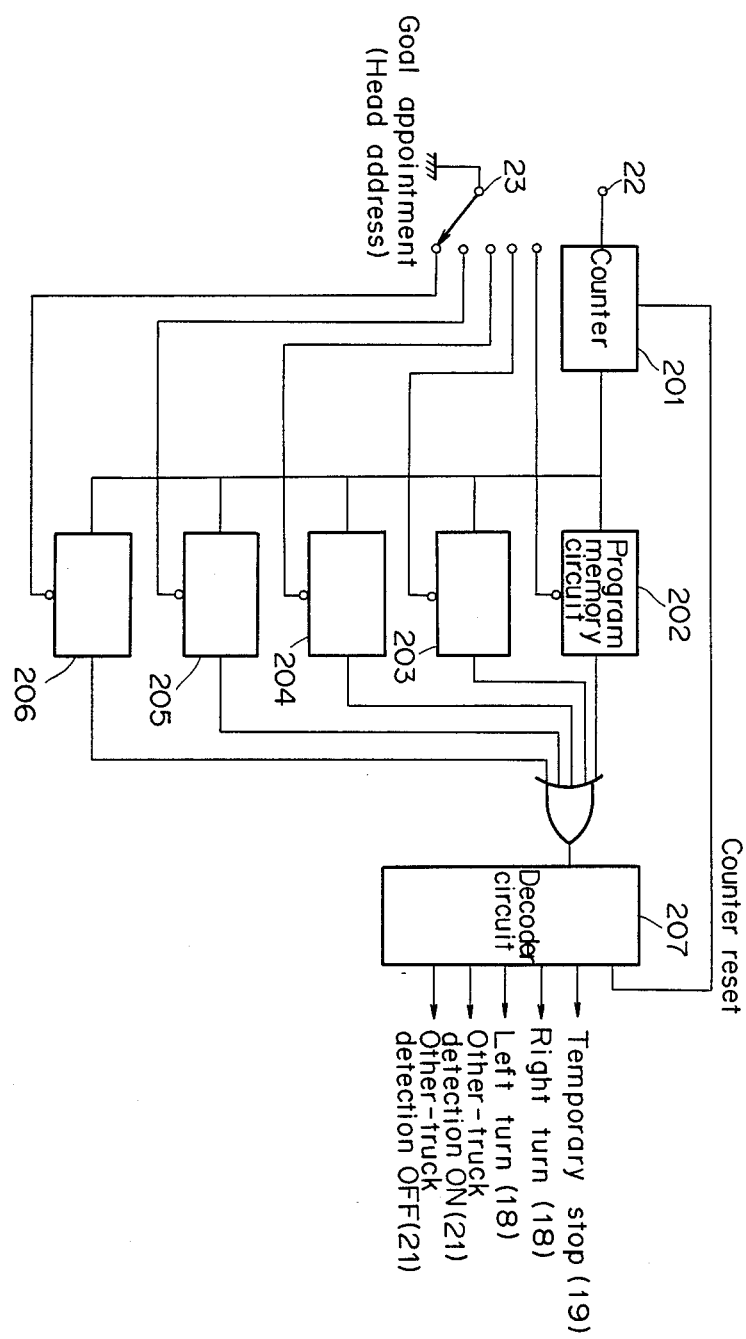
FIG. 16 is a block diagram showing the goal control device of the control apparatus in detail.

This goal control device 20 is supplied with the detection signal from the position detecting sensor 22, and sends a command such as a right-turn, left-turn or crossing control to the branch control device 18, the drive control device 19 or the other-vehicle detection device 21 on the basis of the above detection signal. As shown in FIG. 16 by way of example, it is constructed of a counter 201 which receives the detection signal from the position detecting sensor 22 and counts this detection signal, program memory circuits 202-206 formed of ROMs or RAMs in which the running routes to the respective work stations A-E are stored, and a decoder circuit 207 which decodes the operating code signals of the running routes stored in the program memory circuits 202-206.

The count value of the counter 201 indicates the present position of the unmanned transporting vehicle.

A goal instruction device 23 is connected to the program memory circuits 202-206, and these program memory circuits 202-206 are selected by the goal instruction device 23.

FIG. 17 exemplifies a program for running the work station E, which is stored in the program memory circuit 206. Addresses are associated with the count values of the magnets MG1-MG8, MGA-MGE and MGX (in this embodiment the count values and the addresses are equal). The program is such that the control contents of branch, crossing, confluence etc. at the count values (the present positions of the unmanned transporting vehicle) are coded, and the items of the control contents are listed in the classification of operation codes.

Next, the operation of the goal control device 20 will be described with reference to FIGS. 11, 12, 16 and 17.

In the state in which the unmanned transporting vehicle is at a stop the base camp X, the program memory circuit 206 (in which the program for the running to the work station E is stored) is selected by the goal instruction device 23 by way of example, and the starting pushbutton switch 191 of the drive control device 19 is turned ON. Then, the driving motor 4 is operated to begin the running of the unmanned transporting vehicle.

When the position detecting sensor 22 has subsequently detected the magnet MG1, the detection signal is applied to and counted by the counter 201, and the count value becomes "1". This count value is applied to the program memory circuit 206, and an operation code signal "∅2", stored at the address "1" of the program memory circuit 206 is called and is delivered to the decoder circuit 207. When supplied with the operation code signal "∅2", the decoder circuit 207 decodes it as "left turn" and sends the left-turn signal ("H") to the branch control circuit 18. Thus, the unmanned transporting vehicle is turned to the left.

As the unmanned transporting vehicle having turned to the left is run along the guide track 10 under the control of the steerage control device 17, the position detecting sensor 22 detects the next magnet MG2, and the count value of the counter 201 becomes "2". Likewise to the preceding operation, this count value is applied to the program memory circuit 206, and an operation code signal "∅03" and sends the address "2" of the program memory circuit 206 is called and is delivered to the decoder circuit 207. The decoder circuit 207 decodes the operation code signal "∅3" and sends the right-turn signal ("H") to the branch control circuit 18, so that the unmanned transporting vehicle is turned to the right.

As the unmanned transporting vehicle having turned to the right is run along the guide track 10 under the control of the steerage control device 17, the position detecting sensor 22 detects the magnet MGB, and the count value of the counter 201 becomes "3". Likewise to the proceding operation, this count value is applied to the program memory circuit 206, and an operation code signal "∅∅" stored at the address "3" of the program memory circuit 206 is called and is delivered to the decoder circuit 207. However, the code is neglected in the decoder circuit 207, and the unmanned transporting vehicle continues to run without performing any special motion.

When the position detecting sensor 22 has detected the magnet MG4, the count value of the counter 201 becomes "4". Likewise to the preceding operation, this count value is applied to the program memory circuit 206, and an operation code signal "∅4" stored at the address "4" of the program memory circuit 206 is called and is delivered to the decoder circuit 207. The decoder circuit 207 decodes the operation code signal "∅4", and delivers the activating signal to the other-vehicle detection signal 21.

Upon receiving the activating signal, the other-vehicle detection device 21 transmits the running signal (electromagnetic wave) from the transmitting antenna 211 and begins to receive the running signal transmitted from the other unmanned transporting vehicle, by means of the receiving antenna 212 as described before.

In a case where the receiving antenna 212 does not receive the detection signal from the other unmanned transporting vehicle, the unmanned transporting vehicle enters an intersection while the detection signal is kept transmitted from the transmitting antenna 211. When the position detecting sensor 22 has detected the magnet MG4' in due course, the count value of the counter 201 becomes "5". Likewise to the preceding step, this count value is applied to the program memory circuit 206, and an operation code signal "∅5" stored at the address "5" of the program memory circuit 206 is called and is delivered to the decoder circuit 207. The decoder circuit 207 decodes the operation code signal "∅5", and delivers the deactivating signal to the other-vehicle detection device 21.

When the unmanned transporting vehicle has further run passing the intersection, the position detecting sensor 22 detects the magnet MGE. Thus, the count value of the counter 201 becomes "6". Likewise to the preceding step, this count value is applied to the program memory circuit 206, and an operation code signal "∅1" stored at the address "6" of the program memory circuit 206 is called and is delivered to the decoder circuit 207. The decoder circuit 207 decodes the operation code signal "∅1", and delivers the temporaty stop signal to the drive control device 19.

In this way, the unmanned transporting vehicle stops at the work station E being the destination. After a job in the work station E has ended, the restarting pushbutton switch 192 of the drive control device 19 is turned ON to run the unmanned transporting vehicle again.

When the unmanned transporting vehicle has run till the detection of the magnet MG7 by the position detecting sensor 22, the count value of the counter 201 becomes "7". As in the preceding step, this count value is applied to the program memory circuit 206, and the operation code signal "∅4" stored at the address "7" of the program memory circuit 206 is called, whereupon the other-vehicle detection device 21 is activated as in the foregoing.

When the unmanned transporting vehicle has passed a junction till the detection of the magnet MG7' by the position detecting sensor 22, the count value of the counter 201 becomes "8". Likewise to the preceding step, this count value is applied to the program memory circuit 206, and the operation code signal "∅5" stored at the address "8" of the program memory circuit 206 is called, whereupon the other vehicle detection device 21 is deactivated.

When the unmanned transporting vehicle has run till the detection of the magnet MG8 by the position detecting sensor 22, the count value of the counter 201 becomes "9". As in the preceding step, this count values is applied to the program memory circuit 206, and the operation code signal "∅4" stored at the address "9" of the program memory circuit 206 is called, whereupon the other vehicle detection device 21 is activated.

When the unmanned transporting vehicle has passed a junction and the position detecting sensor 22 has detected the magnet MG8', the count value of the counter 201 becomes "10". As in the preceding step, this count value is applied to the program memory circuit 206, and the operation code signal "∅5" stored at the address "10" of the program memory circuit 206 is called so as to deactivate the other-vehicle detection device 21.

When the position detecting sensor 22 has detected the magnet MGX at last, the count value of the counter 201 becomes "11". As in the preceding step, this count value is applied to the program memory circuit 206, and an operation code signal "1∅" stored at the address "11" of the program memory circuit 206 is called. The decoder circuit 207 delivers the temporary stop signal to the drive control device 19 and simultaneously delivers a reset signal to the counter 201, whereby the unmanned transporting vehicle is stopped at the base camp, and the counter 201 is cleared.

Figure 18:
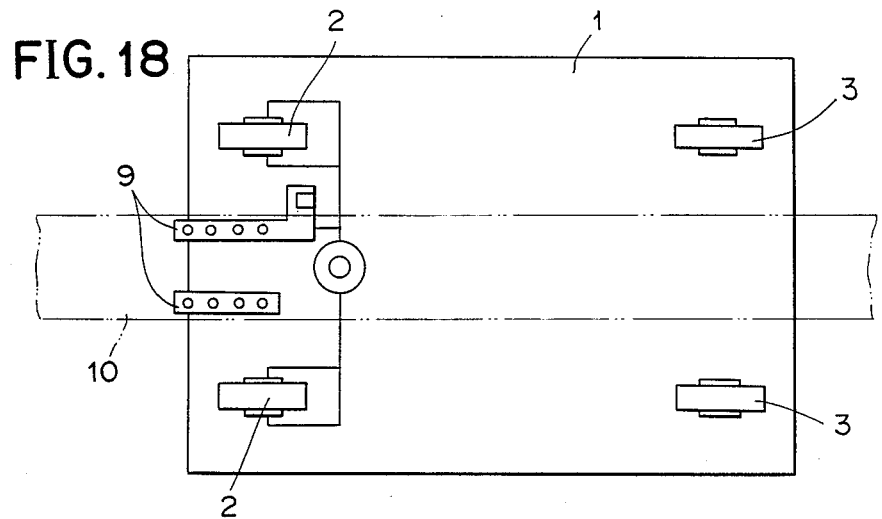
FIGS. 18 and 19 are a bottom view and a front view respectively, showing a four-wheel vehicle which is another embodiment of the unmanned transporting vehicle.
Figure 19:
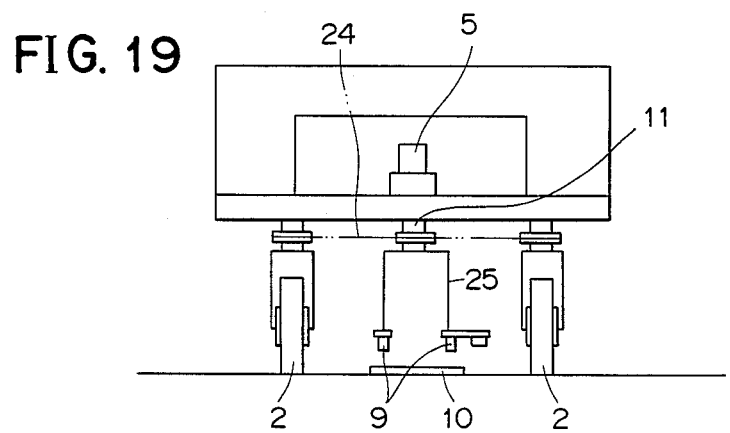
Figure 20:
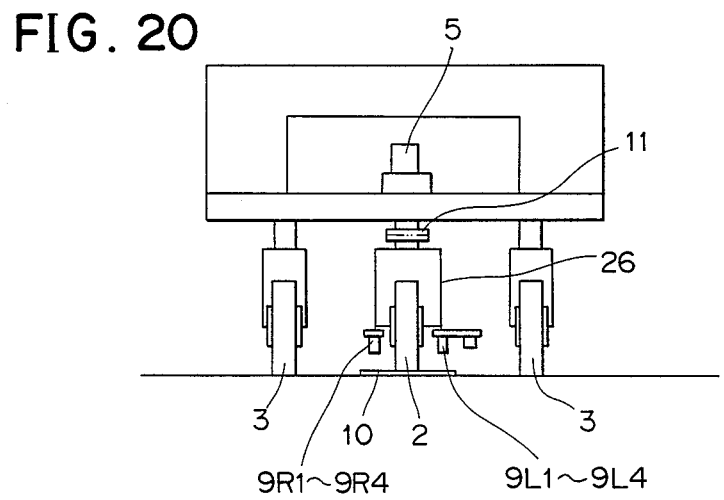
FIG. 20 is a front view of a three-wheel vehicle which is still another embodiment of the unmanned transporting truck.

FIGS. 18–20 show further embodiments of the body 1.

The embodiment shown in FIGS. 18 and 19 is furnished with two front wheels 2, and is a four-wheel vehicle. The rotation of the steering motor 5 is transmitted to the front wheels 2, 2 through a linkage 24. The guide track detection means 9 is mounted on the steering shaft 11 through a supporting member 25. In this embodiment, as in the foregoing embodiment, the front wheels 2 and the rear wheels 3 are adapted to avoid treading the guide track 10, and a malfunction ascribable to the guide track 10 made dirty by the wheels is not feared.

The embodiment shown in FIG. 20 is a three-wheel vehicle similarly to the embodiment described before, but the photodetectors 9L1-9L4 and the photodetectors 9R1-9R4 consituting the guide track detection means 9 are arranged on both the sides of the front wheel 2 in such a manner that they are supported by a supporting member 26 attached to the steering shaft 11.

As thus far described, according to the present invention, guide track detection means is comprised in which a plurality of photodetectors each consisting of a light projecting element for illuminating a road surface with light and a light receiving element for receiving the reflected light of the light of the light projecting element are arranged in two rows along a guide track and at an interval narrower than the guide track, and before an unmanned transporting vehicle undergoes a lateral displacement relative to the guide track, the drift angle between the running direction of the unmanned transporting vehicle and the guide track is detected by the guide track detection means, whereupon the vehicle is steered so as to correct the drift angle. It is therefore permitted to suppress the meandering of the unmanned transporting vehicle to a slight amount and to stably navigate the vehicle to a destination.

In addition, a branch control device is comprised which interrupts the supply of the outputs from the photodetectors to a steerage control device when a position of either of a right turn and a left turn has been detected with a ground mark, and which operates for the right turn to forcibly control a steering mechanism so that a vehicle body may turn to the right, and to release the control and restart the supply of the outputs from the photodetectors to the steerage control device when the light receiving elements of a predetermined number of photodetectors among the photodetectors arranged on a right side of the body have come to receive no reflected light from the optical guide track; and for the left turn to forcibly control the steering mechanism so that the body may turn to the left, and to release the control and restart the supply of the outputs from the photodetectors to the steerage control device when the light receiving elements of a predetermined number of photodetectors among the photodetectors arranged on a left side of the body have come to receive no reflected light from the light-reflective guide. Therefore, the unmanned transporting vehicle can be run along the guide track without departing from the guide track, for the right turn or the left turn. Besides, most of the steerage control device can be shared for the branch control device, and the arrangement of the branch control device is simplified. Further, the single ground mark may be provided at the inlet of a branch section, and the formation and alteration of a running route are easy.

Yet in addition, a goal control device is comprised which includes program memory circuits respectively storing goal programs for individual goals and by which the steerage control device and a drive control device for controlling a driving unit (driving motor) to operate and to stop are controlled in accordance with the goal program so as to run the vehicle body. Therefore, the running routes can be altered merely by changing the contents of the programs of the memory circuits, and it is unnecessary to perform rewiring every alteration of the running route as in case of constructing the goal control device with wired logic, so that the altering operation is easy.

What is claimed is:

1. A guidance system for an unmanned transporting vehicle which runs along a guide track comprising a belt-shaped light-reflective guide track laid out on a floor or the like, said belt-shaped light-reflective guide track having a predetermined width: and at least one unmanned transporting vehicle including body means; front wheel means and rear wheel means mounted to said body means; drive means for driving at least one of said front wheel means and rear wheel means; a steering mechanism for causing said front wheel means to swivel rightward and leftward; a plurality of photodetectors mounted to said body means forwardly of said front wheel means and longitudinally arranged in a right-hand row and a left-hand row above a said belt-shaped light-reflective guide track, said photodetectors including plural pairs of photodetectors, each pair including a right-hand photodetector and a left hand photodetector, said right-hand and left-hand photodetectors being positioned with a spacing less than said predetermined width, said right-hand photodetector having a light projecting element set to project light onto the belt-shaped light reflective guide track and a light receiving element to receive the light reflected thereby for detection of the guide track, said left hand photodetectors having a light projecting element set to project light onto said guide track and a light receiving element to receive the light reflected thereby for detection of the guide track; control means for controlling said steering mechanism such that said front wheel means is caused to swivel leftward when photodetectors in the right-hand row fail to detect the guide track whereas said front wheel means is caused to swivel rightward when photodetectors in the left-hand row fail to detect the guide track, the degree of said swivelling of the front wheel means being substantially in proportion to the number of photodetectors which fail to detect the guide track.

2. A guidance system according to claim 1, wherein said control means has a drive motor which controls said steering mechanism and a plurality of switch circuits connected in parallel with each other and placed in series with said drive motor, each of said switch circuits having a switch corresponding to each of said photodectors and a current limiting resistor in parallel with said switch, said drive motor controlling said steering mechanism by closing said switch when corresponding photodetector fails to detect the guide track.

3. A guidance system according to claim 1, wherein said control means includes a single front wheel, said rearwheel means including a pair of rear wheels, said pair of wheels being provided symmetrically with respect to said front wheel.

4. A guidance system according to claim 3, wherein said photodetectors are positioned on one lateral side of said front wheel.

5. A guidance system according to claim 1, wherein said front wheel means includes a pair of front wheels, said rear wheel means including a pair of rear wheels.

6. A guidance system according to claim 5, wherein said photodetectors are positioned between said front wheels.

7. A guidance system according to claim 1, wherein said guidance system further comprises a plurality of magnets placed along said belt-shaped light-reflective guide track to indicate positions requiring vehicle operations, a magnet detector mounted to said vehicle for detecting said magnets to produce an output, and said control means including a memory unit having a plurality of programs, means to select one of said programs, a decoder for decoding a selected program and executing the content of said selected program in response to the output of said magnet detector.

8. A guidance system according to claim 7, wherein said belt-shaped light-reflective guide track has a common section and branch sections, said common section and branch sections defining branch-off points.

9. A guidance system according to claim 8, wherein said magnets include first magnets placed immediately upstream of said branch-off points to indicate positions requiring left turn or right turn of the vehicle, said control means upon detection of said magnets setting the steering mechanism free from influence of photodetectors and said selected program instructing that front wheel is caused to swivel leftward or rightward, said control means setting again the steering mechanism under the influence of the photodetectors when at least one of said photodetectors in either the left-hand row or the right hand-row fails to detect the guide track.

10. A guidance system according to claim 7, wherein said magnets include second magnets placed along the guide track to indicate positions requiring a halt of the vehicle, said selected program instructing a halt of said vehicle upon detection of said second magnets, said control means including a drive control means which brings the vehicle to a halt in accordance with the instructions.

11. A guidance system according to claim 7, wherein said guide track has intersections.

12. A guidance system according to claim 11, wherein said magnets include third magnets placed immediately upstream of said intersections to indicate positions requiring another-vehicle detection, said selected program instructing another-vehicle detection upon detection of said magnets, said vehicle further including another-vehicle detection means which is actuated in accordance with said instructions and said another-vehicle detection means transmits a warning signal to another vehicle and receives a warning signal from said another-vehicle such that one of two vehicles is stopped.

* * * * *